United States Patent [19]
Eicher

[11] 4,170,379
[45] Oct. 9, 1979

[54] CARRIAGE INSERTABLE INTO THE LOAD SPACE OF A MOTOR VEHICLE

[76] Inventor: Josef Eicher, Eichholz 1108, Balgach, Switzerland, 9436

[21] Appl. No.: 838,446

[22] Filed: Oct. 3, 1977

[30] Foreign Application Priority Data

Oct. 7, 1976 [CH] Switzerland ............ 12738/76

[51] Int. Cl.² .................... B62H 3/02
[52] U.S. Cl. .................... 296/20; 5/81 B
[58] Field of Search ............. 296/20, 19; 280/639, 280/640; 5/81-83, 86; 108/82

[56] References Cited
U.S. PATENT DOCUMENTS

| 3,082,016 | 3/1963 | Pratt | 296/20 X |
| 3,223,429 | 12/1965 | Hastings | 296/20 X |
| 3,759,565 | 9/1973 | Ferneau | 296/20 |
| 4,052,097 | 10/1977 | Weil et al. | 296/20 |

Primary Examiner—Joseph F. Peters, Jr.
Assistant Examiner—Gene A. Church
Attorney, Agent, or Firm—W. G. Fasse; D. F. Gould

[57] ABSTRACT

The present carriage is insertable into the load space of a vehicle such as a station wagon. For this purpose the carriage or vehicle comprises a loading platform and at least two wheels secured to arms which in turn are tiltably secured to the frame structure of the carriage. Roller elements project below the loading platform. The wheels may be arrested in their lowered down position and the arresting may be released when the arms are to be tilted into their upward position when the carriage is not loaded.

10 Claims, 7 Drawing Figures

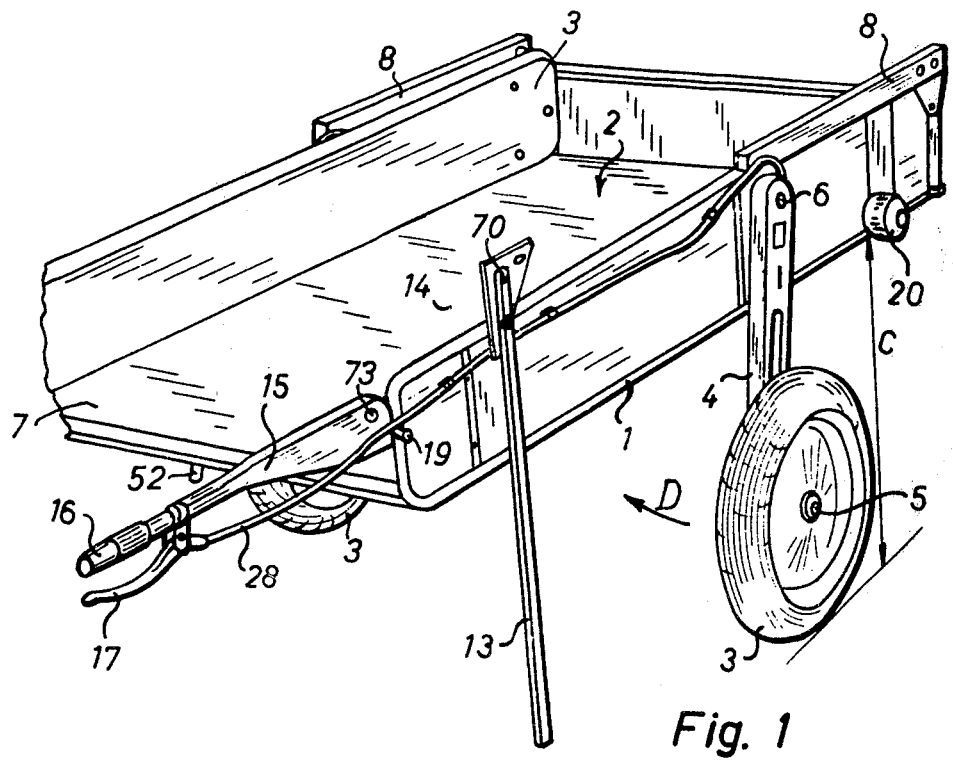

CARRIAGE INSERTABLE INTO THE LOAD SPACE OF A MOTOR VEHICLE

BACKGROUND OF THE INVENTION

This invention relates to a vehicle insertable into the loading space of a motor car, which vehicle comprises a frame, a loading platform and at least two wheels.

Cars provided with a loading space accessible from the rear for the transport of goods or so-called station wagons can be cumberson to load and unload when relatively heavy goods are involved, especially when the goods are to be taken to or brought from a place which is inaccessible to a car. These problems also arise when such a car is to be used by different drivers who have to carry different goods in the loading space.

OBJECTS OF THE INVENTION

The invention seeks to solve the task of providing a vehicle which, due to its low structural height is suitable for the manual loading thereof, together with the goods thereon into the loading space of a car and which may also be used for the transport of such goods over short distances.

SUMMARY OF THE INVENTION

The invention, which solves this task, is characterized in that respectively two wheels are secured to an arm which is tiltable about a horizontal rotational axis on the respective outer side of the frame structure, that at least one roller at the front portion of the vehicle projects below the loading platform, and that locking means are provided for arresting the arms in their lowered position, said locking means being releasable for tilting the arms upwardly when the vehicle is unloaded.

In this way it becomes possible to significantly simplify the transport of goods by cars provided with a loading platform so that in may instances, the need for a transfer loading of goods is completely obviated.

The drawing illustrates example embodiments of the invention.

BRIEF FIGURE DESCRIPTION

In order that the invention may be clearly understood, it will now be described, by way of example, with reference to the accompanying drawings, wherein:

FIG. 1 shows a partial perspective view of the vehicle with its wheels in the lowered position;

FIG. 2 is a perspective view of the vehicle in the position in which it can be pushed into the rearwardly open loading space of a car;

DETAILED DESCRIPTION OF PREFERRED EXAMPLE EMBODIMENTS

Figure 3:
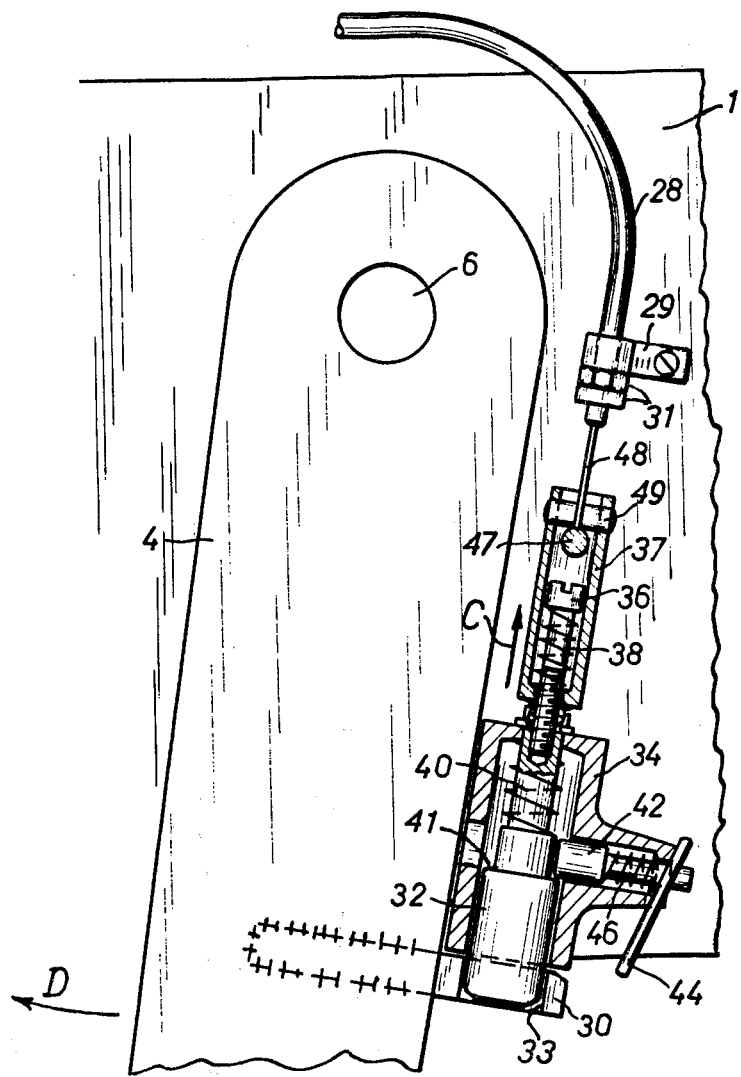
FIG. 3 illustrates a sectional view of the arresting or locking means for the arms.

The vehicle according to FIG. 1 is designed for accomodating goods to be transported and may be pushed together with such goods into the rearwardly opening luggage or load space of a motor vehicle 27, for instance, a station wagon. Additionally, this vehicle may also be used as a two-wheeled cart for short stretches of road transport.

The vehicle has a frame 1 made of sectioned rails or of pipes to form a loading base or platform 2, U-shaped in cross-section, and provided with wooden planking 3 or the like. This loading platform serves for receiving goods to be transported. In the middle third of the length of the vehicle a respective arm 4 is pivotably secured on trunnions 6 on the outside of the frame. A wheel 3 is secured to the lower end of each arm so that the wheel can rotate about a horizontal wheel axle 5. This wheel axle extends outwardly relative to the arm so that the arms 4 together with the wheels can be swung upwardly and rearwardly in the direction of the arrow D above the floor 7 of the loading platform 2. The distance C from the floor of the loading platform to the ground is greater than ⅓ of the width of the loading platform and amounts to at least 30 cm, preferably about 40-55 cm. The diameter of the wheels 3, provided with pneumatic tires is preferably greater than half the distance C.

As can be seen from FIG. 2 both arms may be swung upwardly together with the wheels 3 when it is desired to push the vehicle into the loading space of a motor car.

When the arms 4 project downwardly they are secured in this position by arresting means which prevent any undesired pivotal movement of the arms 4 in the direction of the arrow D.

At the rear end of the frame 1 there are two pivotable handles in the form of struts 15 which may be fixed by means of a respective lug 19 in the positions shown in FIGS. 1 and 2. At the outer end of each strut 15 there is a respective hand grip 16. The two struts 15, when not used, may be swung upwardly by more than 90° so that they extend somewhat parallel to the lowered rear door 21 of the motor car.

At the rear part of the frame there are two pivotable supports 13 which may be locked in the lowered and generally vertical position and which are rotatable about a respective bearing 14 so that in the out-of-use position these supports 13 extend substantially in parallel to the top of the frame. In order to prevent inadvertent displacement of transport goods disposed in the loading platform, partition walls, not shown in the drawing, could be provided.

Two additional pivotable supports 8 are provided at the front of the frame and may be locked in a vertical position. In the operative position these supports 8 are pivoted upwardly so that they lie somewhat in parallel to the upper surface of the frame. A flexible push-pull cable having a cable jacket 28 and a cable core 48 is connected to each of the pivotable struts 15. Each cable ends in a handle 17 and may follow the movements of the struts 15.

At the front end of the frame or adjacent thereto there is a pair of rollers 20 secured to the frame 1. These rollers project somewhat under the floor 7 of the loading platform 2 so as to facilitate the pushing of the vehicle into the loading space of a car. It is also possible to provide only a single roller 20 at the center of the front of the frame for smaller loads or to arrange two roller pairs one behind the other in the front third of the frame when it is anticipated that the vehicle is intended for carrying particularly heavy loads.

In order to prevent inadvertent unlocking of the arms 4 when there is a load on the loading platform 2 a security device is provided to permit pivoting of the arms 4 from the lowered position only when the wheels 3 are not, or substantially not, subject to a load. The security means are shown in FIG. 3. The arms 4 are at a slightly inclined position of 10 to 15° to the vertical, in their lowered position. A member 30 provided with a bore 33 is rigidly connected to each arm 4, the rigid connection being achieved by weld seams, for instance.

A respective housing 34 is rigidly connected with the frame 1 and functions as an abutment for the corresponding arm 4. A locking bolt 32 is supported for axial displacement in the interior of the housing 34 and engages in the locking position in the bore 33 of the member 30. A weak spring 40 urges the locking bolt 32 downwardly and thus into the locking position. A screw 38 or the like is set into the upper end of the locking bolt 32 and the head 36 of the screw 38 projects into and is axially displaceable in the interior of a sleeve 37. Between the head 36 of the screw and the lower end of the sleeve 37 there is a spring 38', the compression of which requires a greater force than that required for the spring 40. A cable core 48 has at one of its ends a thickened portion 47 and is connected with the sleeve 37 by means of a peg 49. The cable jacket 28 of the cable is held on the frame by a cable clip 29. The effective length of the cable core 48 may be altered by means of adjusting nuts 31.

The locking bolt 32 is provided with a shoulder 41 behind which a security pin 42 engages in the locking position, the locking pin 42 being biased by a spring 46. The outwardly projecting end of this pin 42 is pierced through by a cotter pin 44 which in the illustrated position is fitted in a slot in the housing 34. By manually lifting and turning this cotter pin 44 by e.g. 90° the security pin 42 is retracted from the path of movement of the locking bolt 32. The cable 28 and the cable core 48 extend to a respective grip member 17 at the outer end of the struts 15.

The mode of operation of the security device is as follows. When the arms 4 fall down to the lowered position illustrated in FIG. 3, the locking bolts 32 automatically engage in the respective bores 33 of the members 30. Accordingly the arms 4 are secured against pivotal movement. It is assumed that a load is disposed on the loading platform 2 to be carried by the wheels 3. In this case it must be prevented that the locking bolts 32 should become unlocked by inadvertent actuation or misuse of the grip member 17. The securing is accomplished by so selecting the spring force of the spring 38 that it cannot overcome the friction between the locking bolt 32 and a bore 33 of the member 30 and in that the sleeve 37 performs an idling stroke in the direction of the arrow C when the cable 48 is pulled by actuation of the grip 17. The same happens when the security pin 42 is snapped in behind the shoulder 41 of the locking bolt 32, as can be seen from FIG. 3. However, if the wheels 3 are relieved from the load when the vehicle is being inserted into the loading space of a motor car 27, according to FIG. 2, the spring force of the spring 38' is sufficient to move the locking bolt 32 in the direction of the arrow C when a pull is exerted on the cable core 48 against the relatively low friction in the bore 33 and against the biasing force of the weak spring 40.

Figure 4:
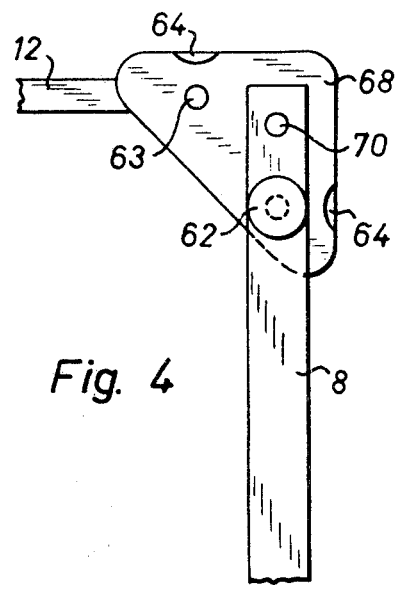
FIG. 4 is a detail of the securing means for the support members.
Figure 6:
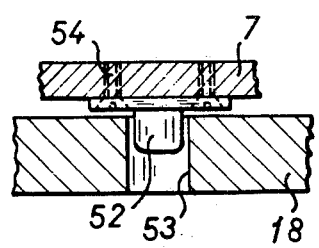
FIG. 6 is a section through a detent lug for securing in a slip-free manner the vehicle of FIG. 1 in the load space of a car.

FIG. 4 illustrates the tiltable mounting of the supports 8 in detail. Each of the supports 8 arranged adjacent to the front end of the frame is tiltable about an axis 70. In the lowered down position of the support 8, a bolt provided with an engagement ball 62 engages in a bore of a triangular sheet metal plate 68 welded to the frame. As can be seen from FIG. 1 in the upwardly tilted position after the support 8 has been rotated by about 270°, the support 8 is held by the same bolt connected to the engagement ball 62 which now engages in a bore 63. In order to facilitate the automatic snapping-in of the bolt, inclined surfaces are provided at the edges of the plate 68. A corresponding construction is provided for the two rear supports 13.

In order to fix the struts 15 in the upwardly tilted position there is provided a catch bolt 19 having an engagement ball for engaging behind a nose 76 of a holder 78. The strut 15 is rotatable about a trunnion 33 relative to the holder 78. In the lowered state of the strut 15 according to FIGS. 1 and 2, this locking bolt 19 engages in the bore 72. The holder 78 is connected to the frame 12 by welding seams 74.

In order to fix the vehicle pushed into the loading space of a car against slippage, a lug 52 engages in a bore 53 of the intermediate floor 18 of the car. The lug 52 is secured to the floor 7 of the vehicle by means of a screw 54.

Figure 7:
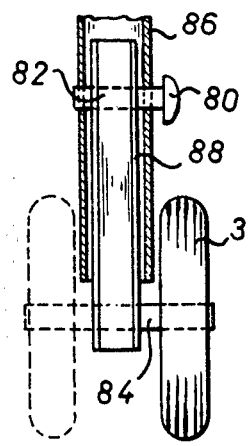
FIG. 7 is a variant of the vehicle for a narrow track width.

FIG. 7 shows a variant of the embodiment wherein the width of the track of the vehicle may be reduced when one desires to push the vehicle through narrow doors or the like. In this embodiment the arms are constructed of pipe sections. An inner pipe section 88 is rotatably inserted in an outer pipe section 86. The relative position of the two pipe sections is fixed by a bolt 82 provided with a head 80. The wheel 3 is mounted on an axle stub 84 which is secured at the lower end of the inner pipe. Normally the wheel 3 is disposed on the outer side of the arm. In order to pass through a narrow passageway the bolt 82 can be pulled out and the inner pipe section 88 together with the wheel turned by 180° about the longitudinal axis so that thereafter it takes up the position shown in dashed lines. This rotation and return rotation can take place only when the arms and the supports 8, 13 are in their respective lower positions.

Figure 5:
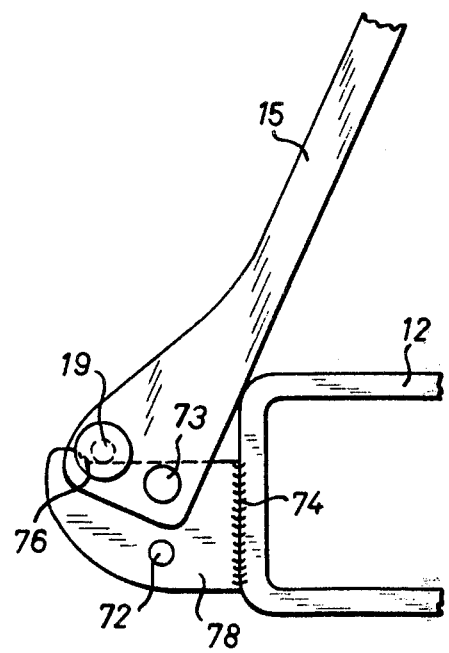
FIG. 5 is a detail of securing means for securing a strut forming part of the vehicle of FIG. 1.

The loading platform 2 can be loaded with goods to be transported outside of the loading space of the motor car and it is assumed that the arms 4 with the wheels 3 are disposed in their position shown in FIG. 1, and the supports 13 are in a vertical position. When the struts 15 are lowered, the vehicle can be lifted more easily because of the lever effect. After the back door 21 has been opened the front of the vehicle can be pushed a small distance into the loading space of the motor car 1 so that the rollers 20 engage and lie on the floor 18 of the motor car and can roll thereon. In this way the wheels 3 are relieved from the load and by actuation of the grips 17 the locking pin 32 snaps out and the arms 4 are swung upwardly when the vehicle is further pushed into the loading space, as can be seen in FIG. 2. The vehicle is pushed into the interior of the loading space of the car until the lug 52 engages in the bore 53 of the floor 18. Thereafter, the struts 15 are pivoted upwardly to their position shown in FIG. 5. Then the back door of the car may be closed. At the place of destination the vehicle may be unloaded from the car together with the goods it carries, whereby the procedure takes place in reverse. Although the invention has been described with reference to specific example embodiments, it will be appreciated, that it is intended to cover all modifications and equivalents within the scope of the appended claims.

I claim:

1. A cart insertable into the loading space of a vehicle, comprising frame means (1) having a given width, a loading platform (2), at least two wheeels, arm means disposed at a respective outer side of the frame means for tilting about a generally horizontal rotational axis (6), individual axle means (5) extending horizontally outwardly from the respective arm means (4) for securing the corresponding wheel means to a respective one of said arm means (4), whereby the arm means (4) and with the arm means the wheels (3) may be tilted into a position above the loading platform (2), roller means secured at the front portion of the vehicle to project below said loading platform, locking and release means arranged for locking the arm means in their lowered position and for releasing said arm means for upward tilting when the arm means are not loaded, said cart further comprising tiltable support means (13) arranged adjacent to the rear end of the cart for steadying the cart, strut means (15) operatively secured to said frame means (1), means for arresting said strut means in its lowered down position, said strut means being tiltable toward said platform (2) to reduce the effective length of the cart when it is inserted in said vehicle, safety means (FIG. 3) operatively connected to said arm means (4) for preventing unlocking of the lowered arm means, said safety means including locking means (30, 32) which automatically engage in said frame means when said arm means are lowered, wherein said arm means (4) are secured to the middle third of the frame means (1), and wherein the distance between the floor and said loading platform (2) corresponds to about ⅓ of said given width of said frame means when the arm means are lowered.

2. The cart of claim 1, wherein said roller means comprise a roller pair arranged adjacent to the front end of the frame means.

3. The cart of claim 1, wherein said tiltable strut means are arranged at the rear end of the frame means, said strut means comprising respective handles.

4. The cart of claim 1, further comprising tiltable support means arranged adjacent to the front end of the vehicle for steadying the vehicle, and means for arresting the tiltable support means in the lowered position.

5. The cart of claim 1, further comprising downwardly projecting holding stud means on the loading platform for engagement of the load space floor of the car.

6. The cart of claim 1, further comprising means for tilting the wheel axle by 180° relative to the longitudinal axis of the arm means.

7. A cart for insertion into the loading space of another vehicle, comprising frame means, a loading platform, at least two wheels, arm means disposed at a respective outer side of the frame means for tilting about a generally horizontal rotational axis, locking and release means arranged for locking the arm means in their lowered position and for releasing said arm means for upward tilting when the arm means are not loaded, safety means for preventing unlocking of the arm means when the wheels are under load, and when said arm means are inclined relative to the vertical in their lowered position, said safety means comprising locking bolt means and tension cable means connected to said locking bolt means, and holding means for said locking bolt means, said holding means including a first member secured to the frame and a second member connected to the arm means, said locking bolt means being disposed between said first member and said second member in such a manner that the friction at the locking bolt means is greater when the wheels are under load than the force that may be applied to said tension cable means for unlocking the locking bolt means.

8. The cart of claim 7, further comprising a yieldable intermediate member operatively inserted between the locking bolt means and the tension cable means, said yieldable member having a resilient force which is so selected that the friction of the engaged locking bolt means may be overcome only when the arm means are relieved of a load.

9. The cart of claim 8, wherein said locking bolt means comprise a shoulder, said safety means further comprising a manually operable spring-loaded latch means arranged to engage said shoulder.

10. A cart for insertion into the loading space of a vehicle, comprising frame means (1), a loading platform (2), at least two wheels, arm means disposed at a respective outer side of the frame means for tilting about a generally horizontal rotational axis (6), individual axle means (5) extending horizontally outwardly from the respective arm means (4) for securing the corresponding wheel means to a respective one of said arm means (4) whereby the arm means and with the arm means the wheels may be tilted into a position above the loading platform (2), locking and release means arranged for locking the arm means in their lowered position and for releasing the arm means for upward tilting when the arm means are not loaded, strut means (15) operatively secured to said frame means (1), means for arresting said strut means in its lowered down position, said strut means being tiltable toward said platform (2) to reduce the effective length of the cart when it is inserted in said loading space, said strut means comprising respective handles, and safety means for preventing unlocking of the lowered arm means when the wheels are under load, and operating means (28, 48) connected to said safety means and to the ends of said strut means (15) whereby upon actuation of said operating means (28, 48), the arm means (4) including the wheels (3) may be tilted upwardly.

* * * * *

UNITED STATES PATENT OFFICE
CERTIFICATE OF CORRECTION

Patent No. 4,170,379         Dated October 9, 1979

Inventor(s)     Josef Eicher

It is certified that error appears in the above-identified patent and that said Letters Patent are hereby corrected as shown below:

Column 5, line 32, replace "about" by --at least--.

Signed and Sealed this

Thirteenth Day of May 1980

[SEAL]

Attest:

SIDNEY A. DIAMOND

Attesting Officer    Commissioner of Patents and Trademarks